(12) United States Patent
Long et al.

(10) Patent No.: US 9,261,294 B2
(45) Date of Patent: Feb. 16, 2016

(54) JOINT HEATING SYSTEM OF GAS COMBINED CYCLE AND SOLAR POWER AND DISPATCHING METHOD THEREOF

(75) Inventors: Hongyu Long, Xi'an (CN); Kai Wu, Xi'an (CN); Yulong Yang, Xi'an (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 497 days.

(21) Appl. No.: 13/809,889

(22) PCT Filed: Dec. 31, 2011

(86) PCT No.: PCT/CN2011/085103
§ 371 (c)(1),
(2), (4) Date: Jan. 12, 2013

(87) PCT Pub. No.: WO2013/060082
PCT Pub. Date: May 2, 2013

(65) Prior Publication Data
US 2013/0270353 A1    Oct. 17, 2013

(30) Foreign Application Priority Data
Oct. 23, 2011    (CN) .......................... 2011 1 0323870

(51) Int. Cl.
| F24H 9/20 | (2006.01) |
| F24H 4/00 | (2006.01) |
| F02C 3/28 | (2006.01) |
| F02C 6/18 | (2006.01) |
(Continued)

(52) U.S. Cl.
CPC ................ *F24H 9/2007* (2013.01); *F02C 3/28* (2013.01); *F02C 6/18* (2013.01); *F24D 19/1039* (2013.01); *F24D 19/1048* (2013.01); *F24H 4/00* (2013.01); *H02J 3/381* (2013.01); *H02J 3/383* (2013.01); *F24D 15/04* (2013.01); *F24D 2200/12* (2013.01); *F24H 2240/00* (2013.01); *Y02B 10/20* (2013.01); *Y02B 10/70* (2013.01); *Y02E 10/563* (2013.01); *Y02E 20/14* (2013.01)

(58) Field of Classification Search
CPC ............. F24D 3/005; F24D 3/08; F24D 3/18;
F24D 12/00; F24D 19/1078; F24D 19/1081;
F24D 19/1048; F24D 19/1039; Y02E 20/14;
Y02E 20/10; Y02B 10/24; F24H 19/2007;
F24H 4/00; H02J 3/383; H02J 3/381
USPC ............. 237/12.1, 2 B, 8 A, 2 A, 13, 19, 2 R;
60/614–624, 320, 597, 648, 206, 266,
60/272, 280, 604; 62/160, 324.2; 122/1 R;
126/19.5, 344; 219/200, 207
See application file for complete search history.

(56) References Cited

U.S. PATENT DOCUMENTS

| 4,143,814 A * | 3/1979 | Hill, Jr. .......................... 126/610 |
| 4,148,436 A * | 4/1979 | Shaw .............................. 237/2 B |

(Continued)

*Primary Examiner* — Gregory Huson
*Assistant Examiner* — Daniel E Namay (57) ABSTRACT

A joint heating system of gas combined cycle and solar power and a dispatching method thereof, the user adopts two ways of the hot water radiator and the heat pump to supply heat, wherein the hot water comes from the gas combined cycle units, the electric power comes from the combination of the gas combined cycle units and the solar power generation units, and after detecting the power supplying and power consumption of the user in a historical time period by the comprehensive dispatching and controlling device, a future time period is predicted, and then dispatching is processed on the basis.

2 Claims, 3 Drawing Sheets

(51) Int. Cl.
  *H02J 3/38* (2006.01)
  *F24D 19/10* (2006.01)
  *F24D 15/04* (2006.01)

(56) References Cited

U.S. PATENT DOCUMENTS

| | | | | |
|---|---|---|---|---|
| 4,987,748 | A * | 1/1991 | Meckler | 62/176.1 |
| 5,131,238 | A * | 7/1992 | Meckler | 62/271 |
| 5,181,387 | A * | 1/1993 | Meckler | 62/59 |
| 5,226,594 | A * | 7/1993 | Swenson | 237/2 B |
| 7,398,778 | B2 * | 7/2008 | Kaiser | 126/101 |
| 2002/0108745 | A1 * | 8/2002 | Kimura | 165/236 |
| 2002/0147506 | A1 * | 10/2002 | Eryurek et al. | 700/28 |
| 2004/0007879 | A1 * | 1/2004 | Ruggieri et al. | 290/52 |
| 2004/0055300 | A1 * | 3/2004 | Lawheed | 60/641.8 |
| 2004/0124638 | A1 * | 7/2004 | van de Loo | 290/40 C |
| 2005/0183421 | A1 * | 8/2005 | Vaynberg et al. | 60/641.8 |
| 2006/0126647 | A1 * | 6/2006 | Hicks, III | 370/401 |
| 2007/0246555 | A1 * | 10/2007 | Nishimura et al. | 237/2 B |
| 2007/0256432 | A1 * | 11/2007 | Zugibe et al. | 62/115 |
| 2008/0023961 | A1 * | 1/2008 | Cho et al. | 290/2 |
| 2008/0094127 | A1 * | 4/2008 | Betser et al. | 327/536 |
| 2010/0064699 | A1 * | 3/2010 | Llurens | 62/79 |
| 2010/0131169 | A1 * | 5/2010 | DiAntonio et al. | 701/100 |
| 2011/0054703 | A1 * | 3/2011 | Heavner, III | 700/282 |
| 2011/0066814 | A1 * | 3/2011 | Narisawa et al. | 711/147 |
| 2011/0227417 | A1 * | 9/2011 | Walker | 307/72 |
| 2012/0049637 | A1 * | 3/2012 | Teichmann et al. | 307/82 |
| 2012/0186575 | A1 * | 7/2012 | Conde | 126/643 |
| 2013/0035794 | A1 * | 2/2013 | Imani | 700/276 |
| 2013/0073098 | A1 * | 3/2013 | Gan et al. | 700/286 |

* cited by examiner

JOINT HEATING SYSTEM OF GAS COMBINED CYCLE AND SOLAR POWER AND DISPATCHING METHOD THEREOF

CROSS REFERENCE OF RELATED APPLICATION

This is a U.S. National Stage under 35 U.S.C 371 of the International Application PCT/CN2011/085103, filed Dec. 31, 2011, which claims priority under 35 U.S.C. 119(a-d) to CN 201110323870.9, filed Oct. 23, 2011.

BACKGROUND OF THE PRESENT INVENTION

1. Field of Invention

The present invention relates to the field of comprehensive utilization of clean energy sources, and more particularly to a joint heating system of gas combined cycle and solar power and a dispatching method thereof.

2. Description of Related Arts

Renewable energy sources have characteristics of being green and clean, and develop fast in recent years. However, taking solar power generation for an example, the solar power generation not only provides clean and low-carbon energy, but also brings negative effect to safe and economic operation of the power grid due to the large-scaled combination of solar plants. After the large-scaled combination of solar plants, the output fluctuation is relatively large, and the fluctuation of power is often reverse to the fluctuation of power load. The reverse load characteristic of solar power causes further enlarging of peak-valley difference of the system, increases the difficulty in dispatching, and produces a series of impact to dispatching and operation of power grid, voltage controlling, and load adjustment of power grid. Due to insufficient relative study, abandoning of power is serious.

SUMMARY OF THE PRESENT INVENTION

An object of the present invention is to provide a joint heating system of gas combined cycle and solar power and a dispatching method thereof, which realizes smooth output of solar power generation and increases efficient utilization of solar power by comprehensive adjustment of thermal energy and electric energy.

Accordingly, in order to accomplish the above object, the present invention provides a joint heating system of gas combined cycle and solar power, comprising:

a gas heating boiler and a gas combined cycle unit for producing electric power and hot water;

a solar power generation unit for producing electric power;

a heat pump of a user, connected in parallel with the gas heating boiler, the gas combined cycle unit and the solar power generation unit via an electric cable network, wherein the heat pump consumes electric power to provide hot water to a hot water heating radiator;

a heat pump remote controller for controlling the heat pump;

an electricity meter for collecting non-heating power consumption of the user;

wherein the hot water heating radiator of the user is connected to the gas combined cycle unit via a heating pipe network, a heating water consumption meter, for detecting a heating water amount inputted into the hot water heating radiator by the gas combined cycle unit;

a hot water heating radiator remote controller for controlling the hot water heating radiator;

a first remote centralized controller, for collecting a production information of heating output hot water flow and generated output power of the gas combined cycle unit, and transmitting the production information collected to a comprehensive dispatching and controlling device, wherein the first remote centralized controller also receives a dispatching and controlling signal sent by the comprehensive dispatching and controlling device, and controls a gas combined cycle unit controlling actuator to work according to the dispatching and controlling signal;

a second remote centralized controller, for collecting a production information of generated output power of the solar power generation unit, and transmitting the production information collected to the comprehensive dispatching and controlling device; and a third remote centralized controller, for storing a pipe distance information of the user between the hot water heating radiator and the gas combined cycle unit, collecting a power consumption information comprising a non-heating power usage of the user, the hot water amount detected by the heating water consumption meter, and the non-heating power consumption, collecting a thermal inertia time period inputted by the user, and transmitting the pipe distance information of the user, the power consumption information collected and the thermal inertia time period to the comprehensive dispatching and controlling device;

the third remote centralized controller, also for receiving a dispatching and controlling signal sent by the comprehensive dispatching and controlling device, and driving the heat pump remote controller and/or the hot water heating radiator remote controller to work according to the dispatching and controlling signal;

wherein the comprehensive dispatching and controlling device produces the dispatching and controlling signal according to the production information, the pipe distance information of the user, and the power consumption information received, and sends the dispatching and controlling signals to the first remote centralized controller and/or the third remote centralized controller.

The comprehensive dispatching and controlling device reduces the heating output hot water flow of the gas combined cycle unit according to the production information of the gas combined cycle unit and the solar power generation unit, and the power consumption information of the user received, under a circumstance of ensuring fulfilling of electric power supply and heating supply, wherein a shortage of a heating need of the user caused by reducing the heating output hot water flow is compensated by the heating pump consuming electric power to heat;

the comprehensive dispatching and controlling device sends the dispatching and controlling signal comprising the heating output hot water flow and the generated output power by the gas combined cycle unit in a dispatching time, the heating water amount inputted into the hot water heating radiator by the gas combined cycle unit and a heating electric power consumption of the heating pump.

The heating pump consumes electric power to compensate heating further according to a time period that the hot water provided by the gas combined cycle unit flows to the user and the thermal inertia time period.

The comprehensive dispatching and controlling device comprises:

a first data receiving unit, for receiving the production information of the gas combined cycle unit and the solar power generation unit, the power consumption information of the user, and the pipe distance information of the user;

a data decoder unit, for decoding all data received;

a data storage unit, for storing all data decoded;

a dispatching and controlling signal computing unit, for generating the dispatching and controlling signals;

a signal coder, for coding the dispatching and controlling signals; and a transmitting unit, for transmitting the dispatching and controlling signals coded to the first remote centralized controller and/or the third remote centralized controller.

The comprehensive dispatching and controlling device is connected with a cloud computing service system via electric power optical fibers, and drives the cloud computing service system to compute, so as to obtain the dispatching and controlling signals; the comprehensive dispatching and controlling device receives the dispatching and controlling signals obtained by the cloud computing service system via the electric power optical fibers, and then transmits the dispatching and controlling signals to the first remote centralized controller and/or the third remote centralized controller via electric power optical fibers or wireless transmission.

The hot water heating radiator remote controller is coupled with the comprehensive dispatching and controlling device via the third remote centralized controller by remote controlling; the heat pump remote controller is coupled with the comprehensive dispatching and controlling device via the third remote centralized controller by remote controlling; a heat pump special electricity meter is provided on the heat pump, for detecting a heating power consumption which is also collected by the third remote centralized controller;

the gas combined cycle unit controlling actuator is coupled with the comprehensive dispatching and controlling device via the first remote centralized controller by remote controlling; the gas combined cycle unit controlling actuator works according to the dispatching and controlling signals.

The third remote centralized controller comprises a non-heating electricity meter pulse counter, a heating hot water flow pulse counter, a pulse signal coder translator, a measuring signal amplification transmitter, and a controlling signal receiving decoder and a remote controlling signal generator connected with each other;

the non-heating electricity meter pulse counter is connected with a non-heating electricity meter of the user, for detecting a non-heating power consumption data of the user, and the non-heating power consumption data of the user is transmitted to the comprehensive dispatching and controlling device after processed by the pulse signal coder translator and the measuring signal amplification transmitter;

the heating hot water flow pulse counter is connected with the heating water consumption meter of the hot water heating radiator, for detecting the hot water amount, the hot water amount is processed by the pulse signal coder translator and the measuring signal amplification transmitter to generate a signal thereof which is transmitted to the comprehensive dispatching and controlling device with a pipe information of the user;

the controlling signal receiving decoder receives the dispatching and controlling signals sent by the comprehensive dispatching and controlling device and decodes, and then sends a controlling signal to the heat pump remote controller and the hot water heating radiator remote controller of a flow valve to work.

A dispatching method of the joint heating system of gas combined cycle and solar power, comprises the steps of:

in a time period of $0 \sim T \times \Delta T$, wherein $\Delta T$ is a sampling period, T is a number of collecting times, predicting a production information in a future time period of $T \sim 2T \times \Delta T$ according to the production information of the gas heating boiler, the gas combined cycle unit and the solar power generation unit received, reducing the heating output hot water flow of the gas heating boiler and the gas combined cycle unit further according to a power consumption information of the user in the time period of $0 \sim T \times \Delta T$ under a circumstance of ensuring fulfilling of electric power supply and heating supply, wherein a shortage of a heating need of the user caused by reducing the heating output hot water flow is compensated by the heating pump consuming electric power to heat, and computing a supplement according to the time period that the hot water provided by the gas heating boiler flows to the user and the thermal inertia time period, by the comprehensive dispatching and controlling device; and then in the time period of $T \sim 2T \times \Delta T$, based on an adjusting period of $\Delta T$, generating the dispatching and controlling signal and sending by the comprehensive dispatching and controlling device, according to predicting and dispatching computing of electric power supply and thermal power supply, controlling the heating output hot water flow and the generated output power by the gas heating boiler and the gas combined cycle unit by the first remote centralized controller after receiving the dispatching and controlling signal, and controlling the heating pump to consume electric power to heat for compensating the shortage of heating caused by reducing the hot water of the hot water heating radiator.

The step of generating the dispatching and controlling signal by the comprehensive dispatching and controlling device, comprises the following steps of:

1) collecting variables, comprising:

1.1) collecting a combined cycle electric power output $P_{COMB}(t)$, a combined cycle heat output $H_{COMB}(t)$, and a heat output $H_{BOIL}(t)$ of the gas heating boiler in the time period of $0 \sim T \times \Delta T$, and sending to the comprehensive dispatching and controlling device, wherein $\Delta T$ is a sampling period, T is a number of collecting times, T is a natural number;

collecting a power generation output of solar power generation units of No. $0 \sim M$, $p_j^{pv}(t)$, in the time period of $0 \sim T \times \Delta T$, and sending to the comprehensive dispatching and controlling device;

1.2) collecting information of ON users in the time period of $0 \sim T \times \Delta T$, which comprises: a pipe distance $S_i$ between the user and the gas heating boiler which is a heat source and the gas combined cycle unit, a non-heating power consumption $P_i(t)$, a heat consumption $H_i(t)$ that the gas heating boiler and the gas combined cycle unit provide to the hot water heating radiator, an installed capacity $P_i^{EHP}$ of the heat pump, and a thermal inertia time period $T_i$ inputted by the user, and sending to the comprehensive dispatching and controlling device;

2) computing following variables, comprising:

2.1) computing a total output $$p_{sum}^{pv}(t) = \sum_{j=0}^{M} p_j^{pv}(t)$$

of the solar power generation units in the time period of $0 \sim T \times \Delta T$, and then predicting a total output $p_{sum}^{pv}(t)$ of the solar power generation units in the time period of $T \sim 2T \times \Delta T$ with statistical analysis technique;

predicting a combined cycle heat output $H_{COMB}(t)$, a heat output $H_{BOIL}(t)$ of the gas heating boiler and a combined cycle electric power output $P_{COMB}(t)$ in the time period of $T \sim 2T \times \Delta T$, according to the combined cycle heat output $H_{COMB}(t)$ of the gas heating boiler and the gas combined cycle unit collected, the heat output $H_{BOIL}(t)$ of the gas heating boiler, and the combined cycle electric power output $P_{COMB}(t)$ in the time period of $0 \sim T \times \Delta T$;

2.2) computing an equivalent distance between each user and the gas heating boiler, $$s_i^* = \frac{\frac{S_i}{v} + T_i}{\Delta T},$$

wherein v is a flow speed of the hot water in the pipe, and processing rounding operation to a result of computing, $s_i = [s_i^*]$ grouping the users of same $s_i$ into an l group, $s_i=l$, wherein there are L groups in total, L is a natural number;

grouping each user, and respectively computing a total heating load $H_{load}(l)$ and a heat pump capacity $P_{EHP}(l)$ of all users in each group;

wherein $H_{load}(l)=\Sigma H_i(t,l)$, $H_i(t,l)$ is a heating load of the user i in the group l at moment t;

wherein $P_{EHP}(l)=\Sigma P_i^{EHP}(l)$, $P_i^{EHP}(l)$ is a heat pump capacity of the user i in the group l;

3) substituting the $P_{ComB}(t)$, $H_{COMB}(t)_{Boil}(t)$, $P_{load}(t)$, $H_{load}(l)$, and $P_{EHP}(l)$, processing iteration based on an optimization problem consisting of an objective function (1) and constraint conditions (2~10), for obtaining an objective function minimum value, so as to obtain the variables as dispatching signals:

3.1) wherein the objective function is:

$$\text{Min: } \Delta p = \sqrt{\sum_{t=T}^{2T}(p_{pv}(t)-\overline{p}_{pv})^2/(T+1)}; \quad (1)$$

wherein $p_{pv}(t)$ is an equivalent total solar power generation output after adjustment, $\overline{p}_{pv}$ is an equivalent average solar power generation output, and an expression is:

$$p_{pv}(t)=P_{pv}(t)(p_{ComB}(t)-P_{ComB}(t))-p_{EHPs}(t); \quad (2)$$

wherein $P_{ComB}(t)$ is the power generation output of the combined cycle unit after adjustment, $P_{COMB}(t)$ is the combined cycle electric power output predicted, $P_{EHPs}(t)$ is the heat pump power consumption of all users at moment t;

$$\overline{p}_{pv}=\Sigma p_{pv}(t)/(T+1); \quad (3)$$

3.2) wherein the constraint conditions comprises:
3.2.1) a heat load balance equation,
wherein when reducing hot water output, a heating shortage is on the supplying side, the power is $\Delta h(t)$, having following formula of:

$$\Delta h(t)=H_{COMB}(t)-h_{COMB}(t)+H_{Boil}(t)-h_{Boil}(t); \quad (4)$$

wherein $H_{COMB}(t)$ is the combined cycle heat output predicted, $H_{BOIL}(t)$ is the heat output of the gas heating boiler predicted, $h_{COMB}(t)$ is the combined cycle heat output of the after adjustment, $h_{Boil}(t)$ is the heat output of the gas heating boiler;

in consideration of the time period that the hot water flows to the user in the pipes and the thermal inertia time period, a needed compensation $\Delta h(t)$ for the user to use the heat pump is expressed as:

$$\Delta h(t) = \sum_{l=0}^{L} h_{EHP}(t+l,l); (T \leq t+l \leq 2T) \quad (5)$$

$h_{EHP}(t+l,l)$ is a sum of the heating power of all heat pumps of the users in the group l at moment t+l;

3.2.2) constraint conditions of the gas heating boiler and the gas combined cycle units:

$$h_{COMB}(t)=f_{COMB}(t)\cdot\eta^q_{ComB}; \quad (6)$$

$$p_{COMB}(t)=f_{COMB}(t)\cdot\eta^e_{ComB}; \quad (7)$$

wherein $\eta_{ComB}^q$ is a combined cycle heat efficiency; $\eta_{ComB}^e$ is a combined cycle power generation efficiency; $h_{COMB}(t)$ is the combined cycle heat output after adjustment, $P_{ComB}(t)$ is the combined cycle electric power output after adjustment, $f_{COMB}(t)$ is the combined cycle power consumption after adjustment;

3.2.3) heat pump constraint conditions on the user side, comprising:
constraint of a ratio of heat to electricity:

$$h_{EHP}(t,l)=COP_{EHP}\cdot p_{EHP}(t,l) \quad (8)$$

wherein $h_{EHP}(t,l)$ is a sum of the heating power of all heat pumps in the user group l at moment t; $COP_{EHP}$ is a coefficient of performance of the heat pump;

maximum output is:

$$0 \leq p_{EHP}(t,l) \leq \min(P_{EHP}(l), H_{load}(l)/COP_{EHP}); \quad (9)$$

a sum of the power consumption of heat pumps in all the user groups at all moment is:

$$p_{EHPs}(t) = \sum_{l=0}^{L} p_{EHP}(t, l) \quad (10)$$

4) according to the adjusted variables in the computing result, generating the dispatching and controlling signal and sending by the comprehensive dispatching and controlling device, comprising:

sending the combined cycle heat output $h_{COMB}(t)$ of the gas heating boiler and the gas combined cycle units, the combined cycle electric power output $P_{ComB}(t)$, and the heat output $h_{Boil}(t)$ of the gas heating boiler to the first remote centralized controller and control actions thereof in each section of a future adjustment time period;

sending the power consumption $P_{EHP}(t,l)$ of heat pumps of all the user and the heat supplying $h_{EHP}(t,l)$ to the third remote centralized controller and controlling actions thereof in each section of a future adjustment time period.

As compared to the prior art, the present invention has the following beneficial technical effect.

Figure 5:
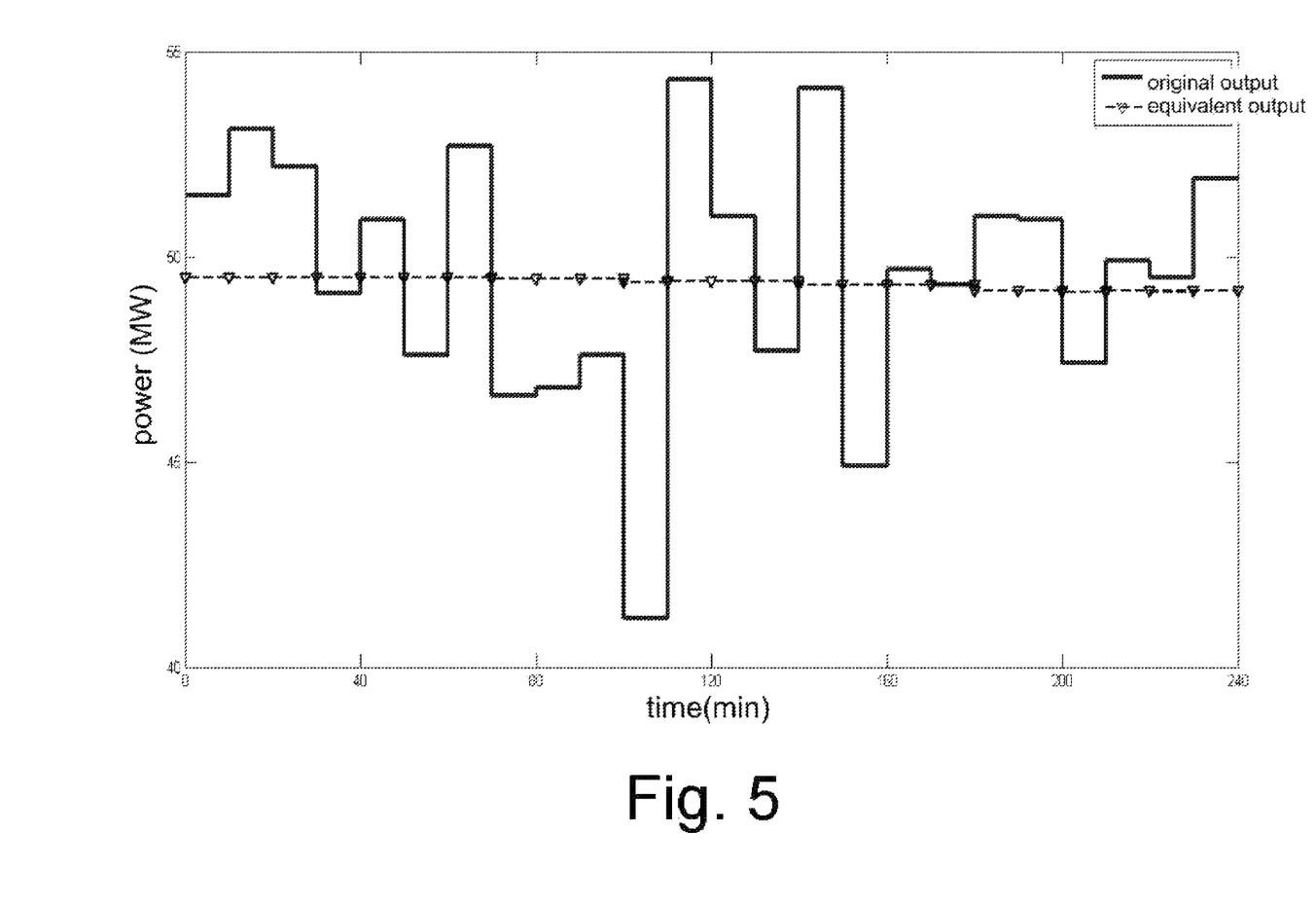
FIG. 5 is a curve comparison between an original solar power generation output and an equivalent solar power generation output after adjustment according to the preferred embodiment of the present invention.

In the joint heating system of gas combined cycle and solar power and the dispatching method thereof according to the present invention, the user adopts two ways of the hot water radiator and the heat pump to supply heat, wherein the hot water comes from the gas combined cycle units, the electric power comes from the combination of the gas combined cycle units and the solar power generation units, and after detecting the power supplying and power consumption of the user in a historical time period by the comprehensive dispatching and controlling device, a future time period is predicted with statistical analysis technique of multiple regression, and then dispatching is processed on the basis as follows:

under the circumstances of ensuring fulfilling of electric power supply and heat supply, reducing of the heating hot water flow output is compensated by consuming electric power to heat, consuming electric power to heat can not only compensate the shortage of hot water heating, but also increases the load in power trough time;

meanwhile, the gas combined cycle units reduce heating hot water flow output, since the total gas consumption is constant, reducing heating can only achieved by reducing gas supplied to the gas heating boiler, and increasing gas in the gas combined cycle, which causes reducing heating hot water production and increasing electric power generation, so as to fulfill the requirement by coupling with solar power generation according to change of power consumption load;

accordingly, solar power generation, and combined production of heat and power is synthesized, the output of the combined production of heat and power is adjusted according to the volatility of solar power generation, and further according to change of power consumption load of the user, based on continuous dispatching method of real-time detection and prediction, with equal detection period and adjustment period, an equivalent smooth output of solar power generation on the user side is realized, the change by adjustment shown in FIG. 5 has significant effect.

In addition, the present invention considers the difference between the two ways of heat supplying, comprising: time delay of the hot water flowing in the pipe, instantaneity of compensating heat by consuming electric power, and thermal inertia time period of users (suspended heating time period the users can accept); thus when compensating with electric power, different pipe distance between users and the heat source is required to be treated respectively. Considering heating time period difference when compensating heating to users, and fully considering energy varying of the supplying side and the user side, helps the smooth output of solar power generation, and also takes account of the actual requirement of users and efficiently utilization of power source.

DETAILED DESCRIPTION OF THE PREFERRED EMBODIMENT

In a joint heating system of gas combined cycle and solar power and a dispatching method thereof according to the present invention, on a supplying side, electric power comes from combination of gas combined cycle units and solar power generation units, hot water comes from gas combined cycle units, a user adopts two ways of hot water radiator and heat pump to supply heat, based on historical detection, power supplying and power consumption in a future time period is predicted, reducing of the heating hot water flow output is compensated by consuming electric power to heat, the gas combined cycle units reduce heating output as well as power generation output, and thus with respect to volatility of solar power generation, a user power consumption load is capable of being adjusted. Consuming power to heat can not only compensate a shortage of heating by hot water, but also increases load in power trough time, and a change of hot water supply causes a change of power generation on the supplying side. When compensating heating to the two ways of heat supplying, by considering time delay of the hot water flowing in the pipe, instantaneity of compensating heat by consuming electric power, and thermal inertia time period of users, the whole system is adjusted effectively. The present invention is further described by accompanying particular system structure and adjustment method, which is only explanation but not limitation.

Figure 1:
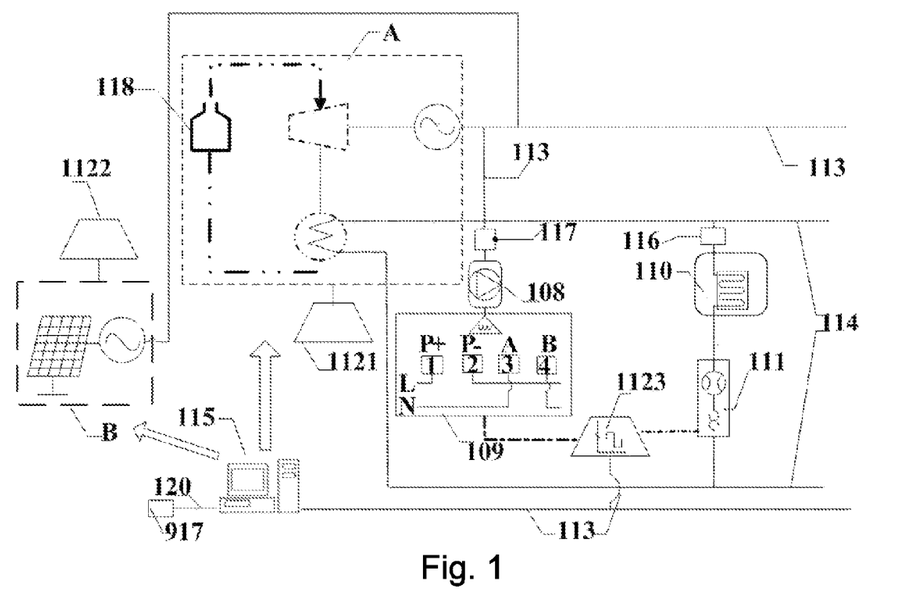
FIG. 1 is a connection sketch view of a joint heating system of gas combined cycle and solar power according to a preferred embodiment of the present invention.

Referring to FIGS. 1-4 of the drawings, a joint heating system of gas combined cycle and solar power according to a preferred embodiment of the present invention is illustrated, comprising a gas heating boiler and a gas combined cycle unit A for producing electric power and hot water;

a solar power generation unit B for producing electric power;

a heat pump 108 of a user, connected in parallel with the gas heating boiler, the gas combined cycle unit A and the solar power generation unit B via an electric cable network 113, wherein the heat pump 108 consumes electric power to provide hot water to a hot water heating radiator 110, wherein a water cycle exists between the heat pump 108 and the hot water heating radiator 110, which is opened when the heat pump 108 works, and closed when the heat pump 108 is idle;

a heat pump remote controller 117 for controlling the heat pump 108;

an electricity meter for collecting non-heating power consumption of the user;

wherein the hot water heating radiator 110 of the user is connected to the gas combined cycle unit A via a heating pipe network 114, a heating water consumption meter 111, for detecting a heating water amount inputted into the hot water heating radiator 110 by the gas combined cycle unit A;

a hot water heating radiator remote controller 116 for controlling the hot water heating radiator 110;

a first remote centralized controller 1121, for collecting a production information of heating output hot water flow and generated output power of the gas heating boiler and the gas combined cycle unit A, and transmitting the production information collected to a comprehensive dispatching and controlling device 115, wherein the first remote centralized controller 1121 also receives a dispatching and controlling signal sent by the comprehensive dispatching and controlling device 115, and controls a gas combined cycle unit controlling actuator 118 to work according to the dispatching and controlling signal;

a second remote centralized controller 1122, for collecting a production information of generated output power of the solar power generation unit B, and transmitting the production information collected to the comprehensive dispatching and controlling device 115;

a third remote centralized controller 1123, for storing a pipe distance information of the user between the hot water heating radiator 110, the gas heating boiler, and the gas combined cycle unit A, collecting a power consumption information comprising a non-heating power usage of the user, the hot water amount detected by the heating water consumption meter 111, and the non-heating power consumption, collecting a thermal inertia time period (a suspended heating time period the users can accept) inputted by the user, and transmitting the pipe distance information of the user, the power consumption information collected and the thermal inertia time period to the comprehensive dispatching and controlling device 115;

the third remote centralized controller 1123 also receives a dispatching and controlling signal sent by the comprehensive dispatching and controlling device 115, and drives the heat pump remote controller 117 and/or the hot water heating radiator remote controller 116 to work according to the dispatching and controlling signal;

wherein the comprehensive dispatching and controlling device 115 produces the dispatching and controlling signal according to the production information, the pipe distance information of the user, and the power consumption information received, and sends the dispatching and controlling signals to the first remote centralized controller 1121 and/or the third remote centralized controller 1123.

Particularly, the comprehensive dispatching and controlling device 115 reduces the heating output hot water flow of the gas combined cycle unit A according to the production information of the gas combined cycle unit A and the solar power generation unit B, and the power consumption information of the user received, under a circumstance of ensuring fulfilling of electric power supply and heating supply, wherein a shortage of a heating need of the user caused by reducing the heating output hot water flow is compensated by the heating pump 108 consuming electric power to heat; when the heating pump 108 consumes electric power to compensate heating, a time period that hot water provided by the gas combined cycle unit A flows to the user, and a thermal inertia time period of the user is also considered;

the comprehensive dispatching and controlling device 115 sends the dispatching and controlling signal comprising the heating output hot water flow and the generated output power by the gas heating boiler and the gas combined cycle unit A in a dispatching time, the heating water amount inputted into the hot water heating radiator 110 of the user and a heating electric power consumption of the heating pump 108.

Figure 2:
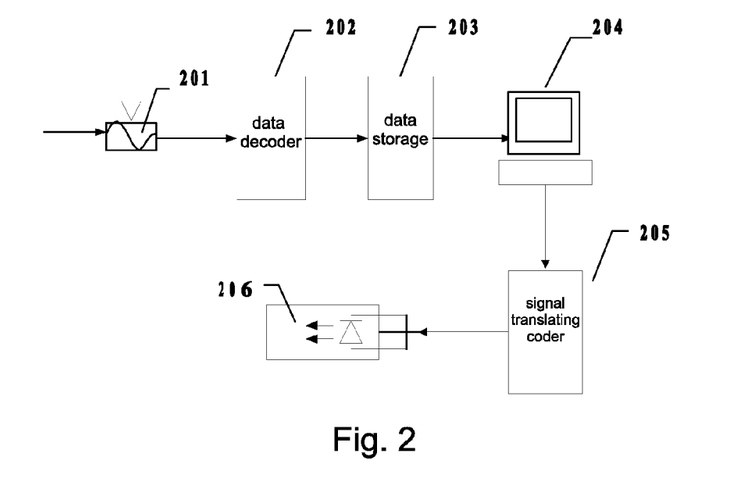
FIG. 2 is a structural sketch view of a comprehensive dispatching and controlling device according to the preferred embodiment of the present invention.

Referring to FIG. 2, the comprehensive dispatching and controlling device 115 comprises:

a first data receiving unit 201, for receiving the production information of the gas heating boiler, the gas combined cycle unit A and the solar power generation unit B, the power consumption information of the user, and the pipe distance information of the user;

a data decoder unit 202, for decoding all data received;

a data storage unit 203, for storing all data decoded;

a dispatching and controlling signal computing unit 204, for generating the dispatching and controlling signals;

a signal coder 205, for coding the dispatching and controlling signals; and a transmitting unit 206, for transmitting the dispatching and controlling signals coded to the first remote centralized controller 1121 and/or the third remote centralized controller 1123.

Figure 3:
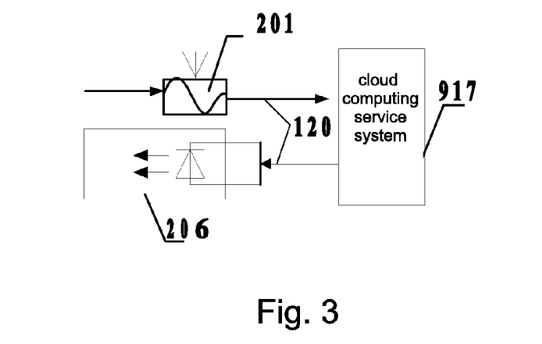
FIG. 3 is a connection sketch view of the comprehensive dispatching and controlling device and a cloud computing system according to the preferred embodiment of the present invention.

Referring to FIG. 3, the comprehensive dispatching and controlling device 115 is connected with a cloud computing service system 917 via electric power optical fibers 120, and drives the cloud computing service system 917 to compute, so as to obtain the dispatching and controlling signals; the comprehensive dispatching and controlling device 115 receives the dispatching and controlling signals obtained by the cloud computing service system 917 via the electric power optical fibers 120, and then transmits the dispatching and controlling signals to the first remote centralized controller 1121 and/or the third remote centralized controller 1123 via electric power optical fibers or wireless transmission.

Particular remote controlling is as follows.

The hot water heating radiator remote controller 116 is coupled with the comprehensive dispatching and controlling device 115 via the third remote centralized controller 1123 by remote controlling; the heat pump remote controller 117 is coupled with the comprehensive dispatching and controlling device 115 via the third remote centralized controller 1123 by remote controlling; a heat pump special electricity meter 109 is provided on the heat pump 108, for detecting a heating power consumption which is also collected by the third remote centralized controller 1123;

the gas combined cycle unit controlling actuator 118 is coupled with the comprehensive dispatching and controlling device 115 via the first remote centralized controller 1121 by remote controlling; the gas combined cycle unit controlling actuator 118 works according to the dispatching and controlling signals.

Figure 4:
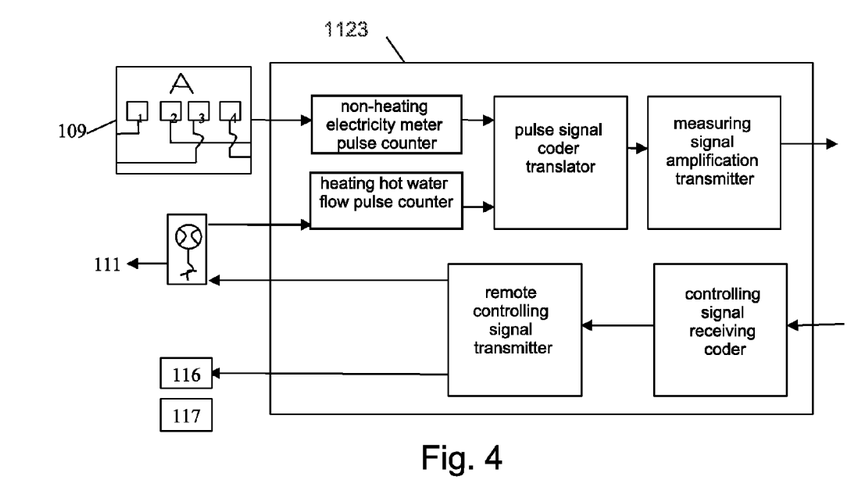
FIG. 4 is a structural sketch view of a third remote centralized controller according to the preferred embodiment of the present invention.

Referring to FIG. 4, the third remote centralized controller 1123 comprises a non-heating electricity meter pulse counter, a heating hot water flow pulse counter, a pulse signal coder translator, a measuring signal amplification transmitter, and a controlling signal receiving decoder and a remote controlling signal generator connected with each other;

the non-heating electricity meter pulse counter is connected with a non-heating electricity meter of the user, for detecting a non-heating power consumption data of the user, and the non-heating power consumption data of the user is transmitted to the comprehensive dispatching and controlling device 115 after processed by the pulse signal coder translator and the measuring signal amplification transmitter;

the heating hot water flow pulse counter is connected with the heating water consumption meter 111 of the hot water heating radiator 110, for detecting the hot water amount provided by the gas combined cycle unit A, the hot water amount is processed by the pulse signal coder translator and the measuring signal amplification transmitter to generate a signal thereof which is transmitted to the comprehensive dispatching and controlling device 115 with a pipe information of the user;

the controlling signal receiving decoder receives the dispatching and controlling signals sent by the comprehensive dispatching and controlling device 115 and decodes, and then sends a controlling signal to the heat pump remote controller 117 and the hot water heating radiator remote controller 116 of a flow valve to work.

The dispatching method of the joint heating system of gas combined cycle and solar power, comprises the steps of:

in a time period of $0\sim T\times\Delta T$, wherein $\Delta T$ is a sampling period, T is a number of collecting times, predicting a production information in a future time period of $T\sim 2T\times\Delta T$ according to the production information of the gas heating boiler, the gas combined cycle unit and the solar power generation unit received, reducing the heating output hot water flow of the gas heating boiler and the gas combined cycle unit further according to a power consumption information of the user in the time period of $0\sim T\times\Delta T$ under a circumstance of ensuring fulfilling of electric power supply and heating supply, wherein a shortage of a heating need of the user caused by reducing the heating output hot water flow is compensated by the heating pump consuming electric power to heat, and computing a supplement according to the time period that the hot water provided by the gas heating boiler flows to the user and the thermal inertia time period, by the comprehensive dispatching and controlling device; and then in the time period of $T\sim 2T\times\Delta T$, based on an adjusting period of $\Delta T$, generating the dispatching and controlling signal and sending by the comprehensive dispatching and controlling device, according to predicting and dispatching computing of electric power supply and thermal power supply, controlling the heating output hot water flow and the generated output power by the gas heating boiler and the gas combined cycle unit by the first remote centralized controller after receiving the dispatching and controlling signal, and controlling the heating pump to consume electric power to heat for compensating the shortage of heating caused by reducing the hot water of the hot water heating radiator.

Thus, based on continuous dispatching method of real-time detection and prediction, the system is adjusted with equal detection period and adjustment period.

The particular step of generating the dispatching and controlling signal by the comprehensive dispatching and controlling device, comprises the following steps of:

1) collecting variables, comprising:

1.1) collecting a combined cycle electric power output $P_{COMB}(t)$, a combined cycle heat output $H_{COMB}(t)$, and a heat output $H_{BOIL}(t)$ of the gas heating boiler in the time period of $0 \sim T \times \Delta T$, and sending to the comprehensive dispatching and controlling device, wherein $\Delta T$ is a sampling period (particularly, 15~30 min), T is a number of collecting times, T is a natural number;

collecting a power generation output of solar power generation units of No. 0~M, $p_j^{pv}(t)$, in the time period of $0 \sim T \times \Delta T$, and sending to the comprehensive dispatching and controlling device;

1.2) collecting information of ON users in the time period of $0 \sim T \times \Delta T$, which comprises: a pipe distance $S_i$ between the user and the gas combined cycle unit which is a heat source, a non-heating power consumption $P_i(t)$, a heat consumption $H_i(t)$ that the gas combined cycle unit provide to the hot water heating radiator, an installed capacity $P_i^{ERP}$ of the heat pump, and a thermal inertia time period $T_i$ inputted by the user, and sending to the comprehensive dispatching and controlling device;

2) computing following variables, comprising:

2.1) computing a total output $$p_{sum}^{pv}(t) = \sum_{j=0}^{M} p_j^{pv}(t)$$

of the solar power generation units in the time period of $0 \sim T \times \Delta T$, and then predicting a total output $p_{sum}^{pv}(t)$ of the solar power generation units in the time period of $T \sim 2T \times \Delta T$ with statistical analysis technique;

predicting a combined cycle heat output $H_{COMB}(t)$, a heat output $H_{BOIL}(t)$ of the gas heating boiler and a combined cycle electric power output $P_{COMB}(t)$ in the time period of $T \sim 2T \times \Delta T$, according to the combined cycle heat output $H_{COMB}(t)$ of the gas heating boiler and the gas combined cycle unit collected, the heat output $H_{BOIL}(t)$ of the gas heating boiler, and the combined cycle electric power output $P_{COMB}(t)$ in the time period of $0 \sim T \times \Delta T$;

2.2) computing an equivalent distance between each user and the gas combined cycle unit, $$s_i^* = \frac{\frac{S_i}{v} + T_i}{\Delta T},$$

wherein v is a flow speed of the hot water in the pipe, and processing rounding operation to a result of computing, $s_i = [s_i^*]$;

grouping the users of same $s_i$ into an l group, $s_i=l$, e.g., grouping the users having $s_i=10$ in to one group, wherein there are L groups in total, L is a natural number;

grouping each user, and respectively computing a total heating load $H_{load}(l)$ and a heat pump capacity $P_{EHP}(l)$ of all users in each group;

wherein $H_{load}(l)=\Sigma H_i(t,l)$, $H_i(t,l)$ is a heating load of the user i in the group l at moment t;

wherein $P_{EHP}(l)=\Sigma P_i^{EHP}(l)$, $P_i^{EHP}(l)$ is a heat pump capacity of the user i in the group l;

3) substituting the $P_{ComB}(t)$, $H_{COMB}(t)$, $H_{Boil}(t)$, $P_{load}(t)$, $H_{load}(l)$ and $P_{EHP}(l)$, processing iteration based on an optimization problem consisting of an objective function (1) and constraint conditions (2~10), for obtaining an objective function minimum value, so as to obtain the variables (i.e., dispatching value of the variables in a future time period) as dispatching signals:

3.1) wherein the objective function is:

$$\text{Min: } \Delta p = \sqrt{\sum_{t=T}^{2T}(p_{pv}(t)-\bar{p}_{pv})^2/(T+1)} \ ; \quad (1)$$

wherein $p_{pv}(t)$ is an equivalent total solar power generation output after adjustment, $\bar{p}_{pv}$ is an equivalent average solar power generation output, and an expression is:

$$p_{pv}(t)=P_{pv}(t)+(p_{ComB}(t)-P_{ComB}(t))-p_{EHPs}(t); \quad (2)$$

wherein $p_{ComB}(t)$ is the power generation output of the combined cycle unit after adjustment, $P_{COMB}(t)$ is the combined cycle electric power output predicted, $p_{EHPs}(t)$ is the heat pump power consumption of all users at moment t;

$$\bar{p}_{pv}=\Sigma p_{pv}(t)/(T+1); \quad (3)$$

3.2) wherein the constraint conditions comprises:

3.2.1) a heat load balance equation, wherein when reducing hot water output, a heating shortage is on the supplying side, the power is $\Delta h(t)$, having following formula of:

$$\Delta h(t)=H_{COMB}(t)-h_{COMB}(t)+H_{Boil}(t)-h_{Boil}(t); \quad (4)$$

wherein $H_{COMB}(t)$ is the combined cycle heat output predicted, $H_{BOIL}(t)$ is the heat output of the gas heating boiler predicted, $h_{COMB}(t)$ is the combined cycle heat output of the after adjustment, $h_{Boil}(t)$ is the heat output of the gas heating boiler;

in consideration of the time period that the hot water flows to the user in the pipes and the thermal inertia time period, a needed compensation $\Delta h(t)$ for the user to use the heat pump is expressed as:

$$\Delta h(t) = \sum_{l=0}^{L} h_{EHP}(t+l, l); (T \le t+l \le 2T) \quad (5)$$

$h_{EHP}(t+l,l)$ is a sum of the heating power of all heat pumps of the users in the group l at moment t+l;

3.2.2) constraint conditions of the gas heating boiler and the gas combined cycle units:

$$h_{COMB}(t)=f_{COMB}(t)\cdot\eta^q_{ComB}; \quad (6)$$

$$p_{COMB}(t)=f_{COMB}(t)\cdot\eta^e_{ComB}; \quad (7)$$

wherein $\eta_{ComB}{}^q$ is a combined cycle heat efficiency; $\eta_{ComB}{}^e$ is a combined cycle power generation efficiency; $h_{COMB}(t)$ is the combined cycle heat output after adjustment, $P_{ComB}(t)$ is the combined cycle electric power output after adjustment, $f_{COMB}(t)$ is the combined cycle power consumption after adjustment;

3.2.3) heat pump constraint conditions on the user side, comprising:

constraint of a ratio of heat to electricity:

$$h_{EHP}(t,l) = COP_{EHP} \cdot p_{EHP}(t,l) \qquad (8)$$

wherein $h_{EHP}(t,l)$ is a sum of the heating power of all heat pumps in the user group l at moment t; $COP_{EHP}$ is a coefficient of performance of the heat pump;

maximum output is:

$$0 \le p_{EHP}(t,l) \le \min(P_{EHP}(l), H_{load}(l)/COP_{EHP}); \qquad (9)$$

a sum of the power consumption of heat pumps in all the user groups at all moment is:

$$p_{EHPs}(t) = \sum_{l=0}^{L} p_{EHP}(t,l) \qquad (10)$$

4) according to the adjusted variables in the computing result, generating the dispatching and controlling signal and sending by the comprehensive dispatching and controlling device, comprising:

sending the combined cycle heat output $h_{COMB}(t)$ of the gas heating boiler and the gas combined cycle units, the combined cycle electric power output $P_{ComB}(t)$, and the heat output $h_{Boil}(t)$ of the gas heating boiler to the first remote centralized controller and control actions thereof in each section of a future adjustment time period;

sending the power consumption $P_{EHP}(t,l)$ of heat pumps of all the user and the heat supplying $h_{EHP}(t,l)$ to the third remote centralized controller and controlling actions thereof in each section of a future adjustment time period.

Referring to the curve comparison between an original solar power generation output and an equivalent solar power generation output after adjustment shown in FIG. 5, it is obvious that before adjustment, the solar power generation output has great fluctuate, and after adjustment, the equivalent solar power generation output is rather smooth, which shows a significant effect by the before-and-after comparison.

What is claimed is:

1. A dispatching method of a joint heating system of gas combined cycle and solar power, the joint heating system of gas combined cycle and solar power comprising:

a gas heating boiler and a gas combined cycle unit (A) for producing electric power and hot water;

a solar power generation unit (B) for producing electric power;

a heat pump (108) of a user, connected in parallel with the gas heating boiler, the gas combined cycle unit (A) and the solar power generation unit (B) via an electric cable network (113), wherein the heat pump (108) consumes electric power to provide hot water to a hot water heating radiator (110);

a heat pump remote controller (117) for controlling the heat pump (108);

an electricity meter for collecting non-heating power consumption of the user;

wherein the hot water heating radiator (110) of the user is connected to the gas combined cycle unit (A) via a heating pipe network (114), a heating water consumption meter (111), for detecting a heating water amount inputted into the hot water heating radiator (110) by the gas combined cycle unit (A);

a hot water heating radiator remote controller (116) for controlling the hot water heating radiator (110);

a first remote centralized controller (1121), for collecting a production information of heating output hot water flow and generated output power of the gas heating boiler and the gas combined cycle unit (A), and transmitting the production information collected to a comprehensive dispatching and controlling device (115), wherein the first remote centralized controller (1121) also receives a dispatching and controlling signal sent by the comprehensive dispatching and controlling device (115), and controls a gas combined cycle unit controlling actuator (118) to work according to the dispatching and controlling signal;

a second remote centralized controller (1122), for collecting a production information of generated output power of the solar power generation unit (B), and transmitting the production information collected to the comprehensive dispatching and controlling device (115); and a third remote centralized controller (1123), for storing a pipe distance information of the user between the hot water heating radiator (110), the gas heating boiler, and the gas combined cycle unit (A), collecting a power consumption information comprising a non-heating power usage of the user, the hot water amount detected by the heating water consumption meter (111), and the non-heating power consumption, collecting a thermal inertia time period inputted by the user, and transmitting the pipe distance information of the user, the power consumption information collected and the thermal inertia time period to the comprehensive dispatching and controlling device (115);

the third remote centralized controller (1123), also for receiving a dispatching and controlling signal sent by the comprehensive dispatching and controlling device (115), and driving the heat pump remote controller (117) and/or the hot water heating radiator remote controller (116) to work according to the dispatching and controlling signal;

wherein the comprehensive dispatching and controlling device (115) produces the dispatching and controlling signal according to the production information, the pipe distance information of the user, and the power consumption information received, and sends the dispatching and controlling signals to the first remote centralized controller (1121) and/or the third remote centralized controller (1123);

the dispatching method comprising the steps of:

in a time period of $0 \sim T \times \Delta T$, wherein $\Delta T$ is a sampling period, T is a number of collecting times, predicting a production information in a future time period of $T \sim 2T \times \Delta T$ according to the production information of the gas heating boiler, the gas combined cycle unit and the solar power generation unit received, reducing the heating output hot water flow of the gas heating boiler and the gas combined cycle unit further according to a power consumption information of the user in the time period of $0 \sim T \times \Delta T$ under a circumstance of ensuring fulfilling of electric power supply and heating supply, wherein a shortage of a heating need of the user caused by reducing the heating output hot water flow is compensated by the heating pump consuming electric power to heat, and computing a supplement according to the time period that the hot water provided by the gas heating boiler flows to the user and the thermal inertia time period, by the comprehensive dispatching and controlling device; and then in the time period of T~2T×ΔT, based on an adjusting period of ΔT, generating the dispatching and controlling signal and sending by the comprehensive dispatching and controlling device, according to predicting and dispatching computing of electric power supply and thermal power supply, controlling the heating output hot water flow and the generated output power by the gas heating boiler and the gas combined cycle unit by the first remote centralized controller after receiving the dispatching and controlling signal, and controlling the heating pump to consume electric power to heat for compensating the shortage of heating caused by reducing the hot water of the hot water heating radiator.

2. The dispatching method of the joint heating system of gas combined cycle and solar power, as recited in claim 1, wherein the step of generating the dispatching and controlling signal by the comprehensive dispatching and controlling device, comprises the following steps of:

1) collecting variables, comprising:

1.1) collecting a combined cycle electric power output $P_{COMB}(t)$, a combined cycle heat output $H_{COMB}(t)$, and a heat output $H_{BOIL}(t)$ of the gas heating boiler in the time period of 0~T×ΔT, and sending to the comprehensive dispatching and controlling device, wherein ΔT is a sampling period, T is a number of collecting times, T is a natural number;

collecting a power generation output of solar power generation units of No. 0~M, $p_j^{pv}(t)$, in the time period of 0~T×ΔT, and sending to the comprehensive dispatching and controlling device;

1.2) collecting information of ON users in the time period of 0~T×ΔT, which comprises: a pipe distance $S_i$ between the user and the gas combined cycle unit which is a heat source, a non-heating power consumption $P_i(t)$, a heat consumption $H_i(t)$ that the gas heating boiler and the gas combined cycle unit provide to the hot water heating radiator, an installed capacity $P_i^{EHP}$ of the heat pump, and a thermal inertia time period $T_i$ inputted by the user, and sending to the comprehensive dispatching and controlling device;

2) computing following variables, comprising:

2.1) computing a total output $$p_{Sum}^{pv}(t) = \sum_{j=0}^{M} p_j^{pv}(t)$$

of the solar power generation units in the time period of 0~T×ΔT, and then predicting a total output $p_{sum}^{pv}(t)$ of the solar power generation units in the time period of T~2T×ΔT with statistical analysis technique;

predicting a combined cycle heat output $H_{COMB}(t)$, a heat output $H_{BOIL}(t)$ of the gas heating boiler and a combined cycle electric power output $P_{COMB}(t)$ in the time period of T~2T×ΔT, according to the combined cycle heat output $H_{COMB}(t)$ of the gas heating boiler and the gas combined cycle unit collected, the heat output $H_{BOIL}(t)$ of the gas heating boiler, and the combined cycle electric power output $P_{COMB}(t)$ in the time period of 0~T×ΔT;

2.2) computing an equivalent distance between each user and the gas combined cycle unit, $$s_i^* = \frac{\frac{S_i}{v} + T_i}{\Delta T},$$

wherein v is a flow speed of the hot water in the pipe, and processing rounding operation to a result of computing, $s_i = [s_i^*]$;

grouping the users of same $s_i$ into an l group, $s_i = l$, wherein there are L groups in total, L is a natural number;

grouping each user, and respectively computing a total heating load $H_{load}(l)$ and a heat pump capacity $P_{EHP}(l)$ of all users in each group;

wherein $H_{load}(l) = \Sigma H_i(t,l)$, $H_i(t,l)$ is a heating load of the user i in the group l at moment t;

wherein $P_{EHP}(l) = \Sigma P_i^{EHP}(l)$, $P_i^{EHP}(l)$ is a heat pump capacity of the user i in the group l;

3) substituting the $P_{ComB}(t)$, $H_{COMB}(t)$ $H_{Boil}(t)$, $P_{load}(t)$, $H_{load}(l)$, and $P_{EHP}(l)$, processing iteration based on an optimization problem consisting of an objective function (1) and constraint conditions (2~10), for obtaining an objective function minimum value, so as to obtain the variables as dispatching signals:

3.1) wherein the objective function is:

$$\text{Min: } \Delta p = \sqrt{\sum_{t=T}^{2T} (p_{pv}(t) - \bar{p}_{pv})^2 / (T+1)} ; \quad (1)$$

wherein $p_{pv}(t)$ is an equivalent total solar power generation output after adjustment, $\bar{p}_{pv}$ is an equivalent average solar power generation output, and an expression is:

$$p_{pv}(t) = P_{pv}(t) - (P_{ComB}(t) - P_{ComB}(t)) - p_{EHPs}(t); \quad (2)$$

wherein $P_{ComB}(t)$ is the power generation output of the combined cycle unit after adjustment, $P_{COMB}(t)$ is the combined cycle electric power output predicted, $p_{EHPs}(t)$ is the heat pump power consumption of all users at moment t;

$$\bar{p}_{pv} = \Sigma p_{pv}(t)/(T+1); \quad (3)$$

3.2) wherein the constraint conditions comprises:

3.2.1) a heat load balance equation, wherein when reducing hot water output, a heating shortage is on the supplying side, the power is Δh(t), having following formula of:

$$\Delta h(t) = H_{COMB}(t) - h_{COMB}(t) + H_{Boil}(t) - H_{Boil}(t); \quad (4)$$

wherein $H_{COMB}(t)$ is the combined cycle heat output predicted, $H_{BOIL}(t)$ is the heat output of the gas heating boiler predicted, $h_{COMB}(t)$ is the combined cycle heat output of the after adjustment, $h_{Boil}(t)$ is the heat output of the gas heating boiler;

in consideration of the time period that the hot water flows to the user in the pipes and the thermal inertia time period, a needed compensation Δh(t) for the user to use the heat pump is expressed as:

$$\Delta h(t) = \sum_{l=0}^{L} h_{EHP}(t+l, l); \; (T \le t+l \le 2T) \quad (5)$$

$h_{EHP}(t+l,l)$ is a sum of the heating power of all heat pumps of the users in the group l at moment t+l;

3.2.2) constraint conditions of the gas heating boiler and the gas combined cycle units:

$$h_{COMB}(t)=f_{COMB}(t)\cdot\eta^q_{ComB}; \quad (6)$$

$$p_{COMB}(t)=f_{COMB}(t)\cdot\eta^e_{ComB}; \quad (7)$$

wherein $\eta_{ComB}^q$ is a combined cycle heat efficiency; $\eta_{ComB}^e$ is a combined cycle power generation efficiency; $h_{COMB}(t)$ is the combined cycle heat output after adjustment, $P_{ComB}(t)$ is the combined cycle electric power output after adjustment, $f_{COMB}(t)$ is the combined cycle power consumption after adjustment;

3.2.3) heat pump constraint conditions on the user side, comprising:

constraint of a ratio of heat to electricity:

$$h_{EHP}(t,l)=COP_{EHP}\cdot p_{EHP}(t,l) \quad (8)$$

wherein $h_{EHP}(t,l)$ is a sum of the heating power of all heat pumps in the user group l at moment t; $COP_{EHP}$ is a coefficient of performance of the heat pump;

maximum output is:

$$0 \le p_{EHP}(t,l) \le \min(P_{EHP}(l), H_{load}(l)/COP_{EHP}); \quad (9)$$

a sum of the power consumption of heat pumps in all the user groups at all moment is:

$$p_{EHPs}(t) = \sum_{l=0}^{L} p_{EHP}(t, l) \quad (10)$$

4) according to the adjusted variables in the computing result, generating the dispatching and controlling signal and sending by the comprehensive dispatching and controlling device, comprising:

sending the combined cycle heat output $h_{COMB}(t)$ of the gas heating boiler and the gas combined cycle units, the combined cycle electric power output $P_{ComB}(t)$, and the heat output $h_{Boil}(t)$ of the gas heating boiler to the first remote centralized controller and control actions thereof in each section of a future adjustment time period;

sending the power consumption $P_{EHP}(t,l)$ of heat pumps of all the user and the heat supplying $h_{EHP}(t,l)$ to the third remote centralized controller and controlling actions thereof in each section of a future adjustment time period.

* * * * *